UNITED STATES PATENT OFFICE 2,381,266

ABRASIVE ARTICLES

Charles E. Drake, Bloomfield, N. J., assignor to United States Rubber Company, New York, N. Y., a corporation of New Jersey No Drawing. Application June 24, 1943,
Serial No. 492,123

2 Claims. (Cl. 51—299)

The present invention relates to the manufacture of abrasive articles and more particularly to a flexible and resilient type of hard rubber grinding wheels.

Abrasive articles in which abrasive grains are bonded by an irreversible or non-thermoplastic bond, for example, hard vulcanized rubber, or synthetic resin of the phenol-formaldehyde or similar type, are well known. In the hard-rubber type bond, the rubber is mixed with about one-half its weight of sulfur, the abrasive grains mixed in, and the material vulcanized to a hard non-resilient grinding wheel or other kind of abrasive article.

According to the present invention, a hard-rubber type bonded abrasive article is produced that has appreciable flexibility and resilience, yet approaches the strength of ebonite. Although a soft rubber compound may be loaded with fillers so as to have almost any degree of hardness, such highly loaded soft-vulcanized rubber compounds, if used as a bonding medium for abrasive grains, will be found very poor in mechanical strength, and if less filler is used, the vulcanized compound will be too soft for many uses, being unable to hold the abrasive grains in place firmly enough to do the work expected of them.

In carrying out the present invention, the abrasive grains are bonded with a vulcanized composition containing hard rubber and a synthetic rubber-like material which will cure irreversibly to a state resembling soft vulcanized rubber but which will not cure to a hard state comparable to that of hard rubber. Examples of such synthetic rubber-like materials that may be mixed with the rubber and sulphur, and vulcanized to give a resilient and flexible hard-rubber type of abrasive article are polymerized chloro-2-butadiene-1,3; copolymers of a major proportion of isobutylene and a minor proportion of a conjugated diolefine copolymerizable therewith, for example, butadiene-1,3, 2 methyl butadiene-1,3 (isoprene), 2,3 dimethyl butadiene-1,3, and pentadiene-1,3; and certain of the so-called organic polysulphide polymer plastics. These synthetic rubber-like materials are obtainable commercially in an intermediate or partially polymerized and plastic state resembling unvulcanized rubber, and may be cured in a known manner to an elastic state resembling soft vulcanized rubber, but not to a hard state comparable to that of hard rubber. When abrasive grains are incorporated in a blend of these partially polymerized materials with a hard rubber mix and the mass cured or vulcanized, a resilient and flexible hard-rubber bond for the abrasive grains is formed.

Polymerized chloro-2-butadiene-1,3 is a commercial material known as neoprene, and is described in the Carothers and Collins Patent 1,950,432. The material will cure on heating, with or without the addition of a so-called curing agent, such as magnesium oxide. Copolymers of a major proportion of isobutylene and a minor proportion of a conjugated diolefine are known under the trade name Butyl Rubber, and are described in British Patent 523,248, and in Ind. and Eng. Chem., vol. 32, pp. 1283-1292. Butyl Rubber may be cured or vulcanized by heating with small amounts of sulphur and the conventional vulcanizing ingredients used with natural rubber, such as zinc oxide and organic accelerators. U. S. patent to Patrick 1,890,191 describes the reaction between alkali polysulphides and olefine compounds, particularly the dihalides, to produce the now well known olefine polysulphide plastics. Such olefine polysulphide plastics are substantially polymers of the structural unit

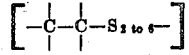

where the carbon atoms are adjacent. U. S. patent to Patrick 2,216,044 describes similar plastic polymers where the space between the adjacent carbon atoms in the above referred structural unit is opened up and an intervening structure is employed such as an ether linkage, unsaturated carbon atoms, aromatic structure, saturated straight chain hydrocarbons, or saturated chain hydrocarbons, giving polymers of the structural unit

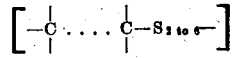

where

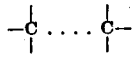

represents two carbon atoms separated by and joined to such an intervening structure. The above polymers of the structural units

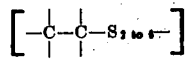

and

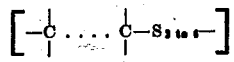

will be termed herein as "organic polysulphide polymer plastics." They are known commercially under the trade name Thiokols. The polymers of substantially the structural units

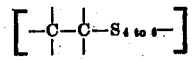

and the polymers of substantially the structural unit

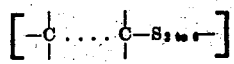

may be cured or vulcanized in a known manner, generally by heating in the presence of 10 to 20 parts of zinc oxide per hundred parts of the Thiokol, to a state resembling soft vulcanized rubber but will not cure to a state comparable to hard rubber. Neoprene, butyl rubber and thiokol are well known types of synthetic rubber.

The term "rubber" as used herein, as in reference to soft vulcanized rubber and hard rubber, means natural rubber. It is well known that there are vast differences in the physical properties of soft vulcanized rubber, which contains up to 10 parts of combined sulphur per 100 parts of rubber, and hard rubber which contains 30 to 47 parts of combined sulphur per 100 parts of rubber. The terms "soft vulcanized rubber" and "hard rubber" are well understood in the art and the properties that distinguish one from the other are so well known that no further definition or distinction need be made than by use of these terms. As illustrative of the great difference in properties of the two materials, the modulus of rigidity of soft vulcanized rubber is of the order of 20 to 100 lbs. per sq. in., while the modulus of rigidity of hard rubber or ebonite is of the order of 100,000 to 200,000 lbs. per sq. in. The elongation at break of soft vulcanized rubber is several hundred percent, while the elongation at break of hard rubber is generally less than fifteen percent. Copolymers of a major proportion of butadiene-1,3 and a minor proportion of a monovinyl compound such as styrene or acrylic nitrile will cure on heating with twenty to forty or more parts of sulphur per one hundred parts of the copolymer to a condition or state where its physical properties are comparable to those of hard rubber as described above. On the other hand, polymerized chloro-2-butadiene-1,3, copolymers of a major proportion of isobutylene and a minor proportion of a diolefine, and the organic polysulphide polymer plastics specified above will vulcanize only to a state or condition where its physical properties resemble those of soft rubber, as described above, but will not cure or vulcanize to a state where its properties are comparable to those of hard rubber.

The preferred proportions of rubber and synthetic rubber-like material in the bond composition are within the range 1:5 to 5:1 parts by weight. With such proportions, bonded abrasive articles with widely varying grinding qualities, flexibility and hardness may be made.

Preferably, the rubber and sulphur are first mixed on a mill and then the partially polymerized rubber-like material, together with curing and compounding ingredients, are blended with the previously mixed hard rubber stock. The resulting blend may then be mill-mixed with a given quantity of abrasive grains, such as aluminum oxide, silicon carbide, or any of the regularly known abrasives. After mixing the intermediate polymerized rubber-like material and hard rubber stock with the abrasive, the resulting mass may be formed into the desired shape of the article and cured. In making grinding wheels, the mix may be sheeted out to the prescribed thickness and, before or after cutting or dieing to shape, heat-cured, as in a press, for example, at 50 pounds steam pressure for upwards of three hours.

Examples of typical formulae for the bond composition are as follows, the amounts of ingredients indicated being parts by weight:

| Bond | I | II | III | IV |
| --- | --- | --- | --- | --- |
| Smoked sheet | 100 | 100 | 100 | 100 |
| Sulphur | 50 | 50 | 50 | 50 |
| Neoprene | 60 | 300 | | |
| Magnesium oxide | 10 | 50 | | |
| Thiokol | | | 100 | |
| Zinc oxide | | | 20 | 10 |
| Butyl rubber | | | | 100 | together with such amounts of antioxidants, accelerators, etc., as are desired. For example, four parts of diphenyl guanidine may be added to each of the above formulae as an accelerator. The Thiokol in formula III above was a commercial organic polysulphide polymer plastic which could be cured to a state resembling soft vulcanized rubber but not to a state comparable to hard rubber. Twenty parts by weight of each of the above bond compounds were mixed with eighty parts by weight of abrasive grains, and the masses sheeted and formed into grinding wheels which were press-cured.

This application is a continuation-in-part of my application Serial No. 448,835, filed June 27, 1942.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. An abrasive article comprising abrasive grains and a bond containing the vulcanization product of a mixture of rubber, sulphur in amount to vulcanize said rubber to hard rubber, and polymerized chloro-2-butadiene-1,3.

2. An abrasive article comprising abrasive grains and a bond containing the vulcanization product of a mixture of rubber, sulphur in amount to vulcanize said rubber to hard rubber, and polymerized chloro-2-butadiene-1,3 being within the range 1:5 to 5:1 parts by weight.

CHARLES E. DRAKE.